US005008086A

United States Patent [19]
Merry

[11] Patent Number: 5,008,086
[45] Date of Patent: Apr. 16, 1991

[54] EROSION RESISTANT MOUNTING COMPOSITE FOR CATALYTIC CONVERTER

[75] Inventor: Richard P. Merry, White Bear Lake, Minn.

[73] Assignee: Minnesota Mining and Manufacturing Company, St. Paul, Minn.

[21] Appl. No.: 263,683

[22] Filed: Oct. 28, 1988

[51] Int. Cl.$^5$ .............................................. B01D 50/00
[52] U.S. Cl. ................................... 422/180; 422/179; 55/523; 55/502; 55/509; 55/DIG. 30
[58] Field of Search .................. 422/179, 180; 55/523, 55/502, 509, DIG. 30

[56] References Cited

U.S. PATENT DOCUMENTS

| 3,916,057 | 10/1975 | Hatch et al. | 428/236 |
| 4,305,992 | 12/1981 | Langner | 428/324 |
| 4,619,912 | 10/1986 | Jabling et al. | 422/180 |
| 4,818,497 | 4/1989 | Andersson et al. | 422/179 |

FOREIGN PATENT DOCUMENTS 1513808 6/1978 United Kingdom .

Primary Examiner—David L. Lacey
Assistant Examiner—Abanti B. Singla
Attorney, Agent, or Firm—Gary L. Griswold; Walter N. Kirn; Andrew D. Sorensen

[57] ABSTRACT

A catalytic converter or diesel particulate trap having a monolithic ceramic element or diesel particulate filter mounted within a metallic casing by a resilient, flexible, erosion resistant mounting composite. The erosion resistant mounting composite is comprised of an intumescent mounting mat protected on at least one lateral edge by a strip of metal fabric.

18 Claims, 1 Drawing Sheet

EROSION RESISTANT MOUNTING COMPOSITE FOR CATALYTIC CONVERTER

BACKGROUND OF THE INVENTION

1. Field of the Invention

The present invention relates to a catalytic converter or diesel particulate trap used to clean the exhaust gas of an internal combustion engine and more particularly, to a catalytic converter or diesel particulate trap having a metallic casing with a monolithic catalytic element or diesel filter securely but resiliently mounted within the casing by an mounting composite comprised of a flexible, resilient, intumescent sheet which has its edges normal to the exhaust flow.

2. Description of the Prior Art

Catalytic converters are universally employed for oxidation of carbon monoxide and hydrocarbons and reduction of the oxides of nitrogen in automobile exhaust gas. Diesel particulate traps are used to collect soot generated by diesel engines. Collected soot is periodically burned off with a gas burner or electrical heater. Due to the high temperatures encountered in either of these environments, ceramic has been the logical choice for catalyst supports or diesel filters.

Ceramic monoliths tend to be frangible and have coefficients of thermal expansion differing markedly from their metal, usually stainless steel, containers. Thus, the mounting means of the ceramic monolith must provide resistance to mechanical shock due to impact and vibration and to thermal shock due to thermal cycling. Both thermal and mechanical shock may cause deterioration of the ceramic support which, once started, quickly accelerates and ultimately renders the device useless. Intumescent sheets that have been found adequate as mounting materials for this purpose are disclosed in U.S. Pat. Nos. 3,916,057, 4,305,992 and U.K. Patent No. 1,513,808.

Intumescent sheet mounting materials do an adequate job of holding the ceramic monolith or diesel particulate filter in place while resisting erosion at moderate exhaust temperatures (less than 700° C.), and moderate pressure pulsations of the exhaust gas, as in six and eight cylinder engines. However, with the trend towards smaller, four cylinder engines running at higher rotation velocities and with the advent of catalytic converters in Europe, with their high speed driving conditions, present mounting materials are being subjected to much higher exhaust temperatures and more severe pressure pulsations. Under these conditions, over a period of time, present mounting materials can be eroded.

It is therefore an object of this invention to provide a ceramic monolith mounting composite for catalytic converter elements or diesel particulate traps which can withstand the erosion effects of higher exhaust temperatures and more severe pressure pulsations associated with present operating conditions.

SUMMARY OF THE INVENTION

The present invention relates to a catalytic converter or diesel particulate trap for use in an exhaust system of an internal combustion engine wherein a novel erosion resistant mounting composite is utilized to securely mount the monolithic catalytic element or diesel particulate filter within its casing. The novel erosion resistant mounting composite is comprised of an intumescent mounting mat protected on at least a portion of one lateral edge by a strip of metal fabric wrapped around the lateral edge. The fabric is preferably stainless steel which is woven, knitted, or braided from wire less than 1.0 mm in diameter having an open area of less than 85%, preferably about 40%. Flexibility of the erosion resistant mounting composite when woven metal fabric is used is provided by orienting the wires comprising the woven metal fabric such that the wires, when wrapped about the lateral edge, form an angle of from 15° to 75°, preferably 45°, with the lengthwise direction of the edge.

DETAILED DESCRIPTION OF THE INVENTION

Figure 1:
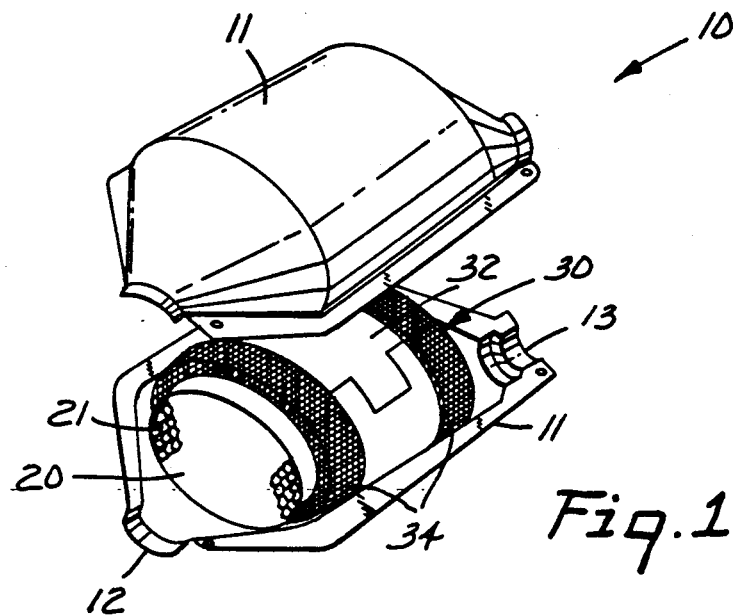
FIG. 1 is a exploded perspective view of a catalytic converter or diesel particulate trap of the present invention.
Figures 2A, 2B:
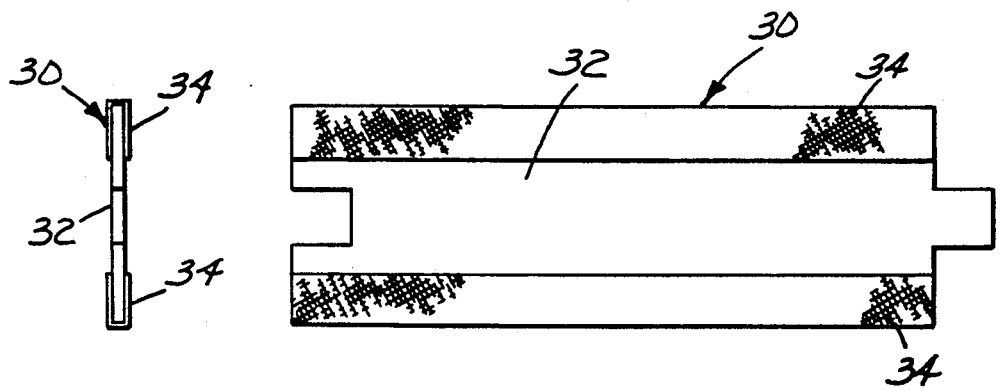
FIG. 2A is a plan view of the erosion resistant mounting composite of the invention.
FIG. 2B is an edge view of the erosion resistant mounting composite of the invention.
Figure 2C:
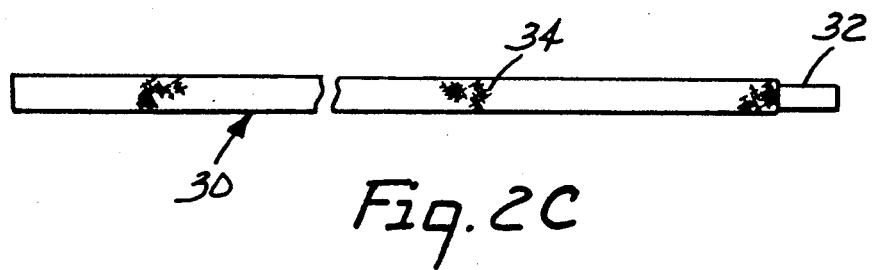
FIG. 2C is an end view of the erosion resistant mounting composite of the invention.

Referring now to the drawings, catalytic converter or diesel particulate trap 10 comprises metallic casing 11 with generally frustoconical inlet and outlet ends 12 and 13, respectively. Disposed within casing 11 is a monolithic catalytic element or diesel particulate filter 20 formed of a honeycombed ceramic having a plurality of gas flow channels 21 therethrough. Surrounding catalytic element or diesel particulate filter 20 is erosion resistant mounting composite 30 of the invention.

Erosion resistant mounting composite 30 is comprised of an intumescent mounting mat 32 protected on both lateral edges by a strip of metal fabric 34. Mounting composite 30 serves to tightly but resiliently support catalytic element or diesel particulate filter 20 within the casing 11 by expansion in situ of mounting mat 32. It further acts to seal the gap between catalytic element or diesel particulate filter 20 and casing 11 to thus prevent exhaust gases from by-passing the catalytic element or diesel particulate filter 20. Metal fabric 34 serves to protect the edges of mounting mat 32 from erosion caused by the impact of exhaust gases.

The mounting mat 32 is a resilient, flexible, intumescent sheet comprising from about 20% to 65% by weight of unexpanded vermiculite flakes, such flakes being either untreated or treated by being ion exchanged with an ammonium compound such as ammonium dihydrogen phosphate, ammonium carbonate, ammonium chloride or other suitable ammonium compound; from about 10% to 50% by weight of inorganic fibrous material including aluminosilicate fibers (available commercially under the tradenames Fiberfrax, Cerfiber, and Kaowool), asbestos fibers, soft glass fibers, zirconia-silica fibers and crystalline alumina whiskers; from about 3% to 20% by weight of binder including natural rubber latices, styrene-butadiene latices, butadiene acrylonitrile latices, latices of acrylate or methacrylate polymers and copolymers and the like; and up to about 40% by weight of inorganic filler including expanded vermiculite, hollow glass microspheres and bentonite. The mat 32 is made following basic papermaking techniques.

The metal fabric 34 of this erosion resistant mounting composite 30 of this invention is a strip of woven metal, preferably stainless steel, made of wire less than 1.0 mm in diameter, preferably about 0.23 mm diameter and having an open area of less than 85%, preferably about 40%. The fabric 34 generally has square openings, although they can be rectangular, and are generally less than 7 mm wide, preferably about 0.4 mm wide. The intersecting wires are generally of the same diameter, although not limited to being so. In order to maintain flexibility, the cloth must be oriented on the intumescent mat 32 such that the wires making up the cloth make an angle of from 15° to 75°, preferably 45° with the lengthwise edge of the mat. When woven, the wires cross at an angle of 90°, so the angle of one wire with respect to the edge of mounting composite 30 is the complement of the angle of the other wire (90° minus the angle of the other wire). Thus, either of the crossing, woven wires may be used to determine the angle of the mesh with respect to the edge of the mounting mat 32.

Also useful as an erosion protection for the mat is metal fabric, preferably stainless steel, that is knitted or braided instead of woven, made of wire less than 1.0 mm diameter, preferably about 0.15 mm diameter, with an open area of less than 85%. This fabric is generally softer and easier to handle than the woven cloth. Because of the curved nature of the wires making up the knitted or braided fabric, it can oriented in any direction on the mat edge without adversely affecting the flexibility of the mounting composite 30.

The metal fabric 34 edge protectors described above were made from wires having a round cross section. They could, of course, be constructed of wires having square, rectangular or any other shaped cross section without departing from the scope of the present invention.

The metal fabric 34 edge protection can be secured to the intumescent mounting mat 32 with tape or adhesive, or by mechanic means, such as sewing, stapling, staking or crimping. No external means of fastening is required if the fabric 34 is placed over the mounting mat 32 edge immediately prior to assembly of the converter or trap 10. The metal fabric 34 edge protection should extend 5 to 50 mm beyond the lengthwise edge of the intumescent mounting mat 32. The drawings show the metal fabric 34 edge protection to cover the entire length of the intumescent mounting mat 32. Naturally, it is possible to cover only a portion of one or both edges of the mounting mat 32.

An erosion test was devised to test the ability of mounting composites 30 to resist edge erosion from an impinging air stream. The test consists of taking a 25.4 mm×25.4 mm sample of mounting composite 30 and mounting it between two steel anvils to a predetermined gap by means of steel spacers. This assembly is then heated to 800° C. for one hour to burn out the organic binder. After weighing it to the nearest 0.01 g, it is mounted in a device where the edge of the mounting composite 30 is exposed to an impinging air stream of near sonic velocity, which oscillates along the edge of the mounting composite 30 at a rate of 20 cycles/second over a distance of 19 mm. The air stream oscillates at a distance of 3.8 mm from the edge of the sample. After testing, the sample is again weighed, and weight loss per unit time, i.e., erosion rate is calculated. Standard intumescent sheets sold under the brand name Interam™ Automotive Mat, Series IV of 4.9 mm nominal thickness were tested with and without various metal fabric 34 edge protections. Results are shown in Table I.

TABLE I

| MATERIAL | MOUNT DENSITY (g/cc) | EROSION RATE (g/cc) |
| --- | --- | --- |
| Normal, No Protection | 0.629 | 0.960 |
| Normal, No Protection | 0.700 | 0.055 |
| 20 mesh, 0.23 mm wire, SS woven cloth protection | 0.691 | 0.0023 |
| 40 mesh, 0.23 mm wire, SS woven cloth protection | 0.619 | 0.0004 |
| 100 density, 0.15 mm wire SS knitted fabric protection | 0.759 | 0.0024 |

The test results show that the metal fabric 34 edge protection of the present invention drastically reduces the erosion rate of the intumescent mounting mat 32.

To test the suitability of various metal fabric 34 edge protections in terms of flexibility, various edge protections were bonded to the edges of intumescent mounting mat 32 parts and then wrapped around an 8.08 cm×16.97×12.7 cm long oval catalytic element 20. To be acceptable, the mounting composite 30 part must remain in contact with the surface of the catalytic element 20 and not buckle when wrapped around it. Results are shown in Table II.

TABLE II

| TYPE OF EDGE PROTECTION | DESCRIPTION | RESULTS |
| --- | --- | --- |
| Stainless Steel Foil | 0.05 mm thick, annealed | Unacceptable, mat buckled |
| 20 mesh stainless steel woven cloth | 0.23 mm wire, wires 10° & 80° to lengthwise edge | Unacceptable, mat buckled |
| 20 mesh stainless steel woven cloth | 0.23 mm wire, wires 20° & 70° to lengthwise edge | Acceptable, no buckling |
| 20 mesh stainless steel woven cloth | 0.23 mm wire, wires 45° to lengthwise edge | Acceptable, no buckling |
| 80 mesh stainless steel woven cloth | 0.14 mm wire, wire at 0° & 90° to lengthwise edge | Unacceptable, mat buckled |
| 80 mesh stainless steel woven cloth | 0.14 mm wire, wires at 45° to lengthwise edge | Acceptable, no buckling |
| Knitted wire fabric | 0.15 mm wire, 100 density | Acceptable, no buckling |
| Knitted wire fabric | 0.11 mm wire, 130 density | Acceptable, no buckling |

I claim:

1. An improved catalytic converter including a metallic casing, a ceramic catalytic element disposed within the casing, and a mounting composite disposed between the catalytic element and the metallic casing for positioning the catalytic element within the casing and for absorbing mechanical and thermal shock, said mounting composite comprising a resilient, flexible, high temperature resistant intumescent mounting mat having a lateral edge, wherein the improvement comprises:

a strip of metal fabric positioned between at least a portion of the lateral edge of said mounting mat and said casing so to cover the lateral edge in order to prevent erosion of said mounting composite.

2. An improved catalytic converted according to claim 1 wherein the intumescent mounting mat comprises from 20% to 65% by weight of an unexpanded vermiculite, from 10% to 50% by weight of an inorganic fibrous material and from 3% to 20% by weight of a binder.

3. An improved catalytic converter according to claim 2 wherein said vermiculite has been ion-exchanged with an ammonium compound.

4. An improved catalytic converter according to claim 2 wherein said inorganic fibrous material is asbestos, soft glass fiber, alumina whisker, alumina-silica fiber or zirconia-silica fiber.

5. An improved catalytic converter according to claim 2 wherein said binder is an organic or inorganic material or combination thereof.

6. An improved catalytic converter according to claim 1 wherein said metal fabric is selected from the group consisting of steel, stainless steel, galvanized steel, metal alloys or combinations thereof.

7. An improved catalytic converter according to claim 6 wherein said metal fabric comprises a multiplicity of wires formed as a woven, braided or knitted wire fabric.

8. An improved catalytic converter according to claim 7 wherein said metal wires are less than 1.0 mm in diameter.

9. An improved catalytic converter according to claim 7 wherein said woven wire fabric is wrapped about said intumescent mounting mat edge and said wires of said metal fabric form an angle of from 15° to 75° with said edge.

10. An improved diesel particle trap including a metallic casing, a ceramic diesel particulate filter disposed within the casing, and a mounting composite disposed between the diesel particulate filter and the metallic casing for positioning the particulate filter and for absorbing mechanical and thermal shock, said mounting composite comprising a resilient, flexible, high temperature resistant intumescent mounting mat having a lateral edge, wherein the improvement comprises:

a strip of metal fabric positioned between at least a portion of the lateral edge of said mounting mat and said casing, so as to cover the lateral edge, in order to prevent erosion of said mounting composite.

11. An improved diesel particulate trap according to claim 10 wherein the intumescent mounting mat comprises from 20% to 65% by weight of an unexpanded vermiculite, from 10% to 50% by weight of an inorganic fibrous material and from 3% to 20% by weight of a binder.

12. An improved diesel particulate trap according to claim 11 wherein said unexpanded vermiculite has been ion-exchanged with an ammonium compound.

13. An improved diesel particulate trap according to clam 11 wherein said inorganic fibrous material is selected from a group consisting of asbestos, soft glass fiber, alumina whisker, alumina-silica fiber or zirconia-silica fiber.

14. An improved diesel particulate trap according to claim 11 wherein said binder is an organic or inorganic material or combination thereof.

15. An improved diesel particulate trap according to claim 10 wherein said metal fabric is selected from the group consisting of steel, stainless steel, galvanized steel, metal alloys or combinations thereof.

16. An improved diesel particulate trap according to claim 15 wherein said metal fabric comprises a multiplicity of wires formed as a woven, braided or knitted wire fabric.

17. An improved diesel particulate trap according to claim 16 wherein said metal wires are less than 1.0 mm in diameter.

18. An improved diesel particulate trap according to claim 16 wherein the wires of said woven wire fabric when wrapped about the intumescent mounting mat edge form an angle of from 15° to 75° with the lateral edge.

* * * * *